(12) United States Patent
Watanabe

(10) Patent No.: US 8,107,126 B2
(45) Date of Patent: Jan. 31, 2012

(54) DOCUMENT MANAGEMENT APPARATUS AND METHOD APPLYING PRINT SETTINGS RESPONSIVE TO DRAGGING AND DROPPING DOCUMENT ICON

(75) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 12/361,376

(22) Filed: Jan. 28, 2009

(65) Prior Publication Data
US 2009/0195823 A1 Aug. 6, 2009

(30) Foreign Application Priority Data

Feb. 4, 2008 (JP) ................................. 2008-024309

(51) Int. Cl.
*G06K 15/02* (2006.01)
*G06F 3/12* (2006.01)
*G06F 3/048* (2006.01)
(52) U.S. Cl. ......... 358/1.9; 358/1.15; 715/769; 715/835
(58) Field of Classification Search ................... 358/1.9, 358/1.13, 1.15, 1.18; 715/249, 273, 274, 715/769, 835; 709/219, 223
See application file for complete search history.

(56) References Cited

U.S. PATENT DOCUMENTS

| 6,149,323 | A * | 11/2000 | Shima .............................. 400/76 |
| 7,707,274 | B2 * | 4/2010 | Umehara et al. .............. 709/219 |
| 7,757,180 | B2 * | 7/2010 | Nakai et al. .................... 715/769 |
| 7,792,927 | B2 * | 9/2010 | Umehara et al. .............. 709/219 |
| 2003/0156479 | A1 | 8/2003 | Fujiyoshi |
| 2006/0087680 | A1 | 4/2006 | Maeda |
| 2008/0049249 | A1 * | 2/2008 | Tomita ......................... 358/1.15 |
| 2010/0007928 | A1 * | 1/2010 | Kashioka ..................... 358/474 |
| 2010/0214571 | A1 * | 8/2010 | Luo ............................... 358/1.1 |

FOREIGN PATENT DOCUMENTS

| JP | 2003-308200 A | 10/2003 |
| JP | 2006-120041 A | 5/2006 |

OTHER PUBLICATIONS

HP Photosmart Plus All-in-One Overview Fact Sheet, 2009.*
Drag and Drop Printing, FLFSoft Inc., Oct. 9, 1999.*

* cited by examiner

*Primary Examiner* — Scott A Rogers
(74) *Attorney, Agent, or Firm* — Canon U.S.A., Inc. IP Division

(57) ABSTRACT

A document management apparatus includes a receiving unit configured to receive a notification indicating that an icon for a first document has been drag-and-dropped onto an icon for a second document via a display screen, and an application unit configured to apply a print setting stored in the first document to the second document in response to the receiving unit receiving the notification indicating that the icon for the first document has been drag-and-dropped onto the icon for the second document.

9 Claims, 10 Drawing Sheets

FIG.4

| PRINT SETTING | SOURCE DOCUMENT | TARGET DOCUMENT (BEFORE CHANGE) | TARGET DOCUMENT (AFTER CHANGE IS APPLIED) |
|---|---|---|---|
| TWO-SIDED PRINTING | ○ | × | ○ |
| STAPLING | ○ | ○ | ○ |
| PUNCHING | × | ○ | × |
| Z-FOLDING | ○ | × | ○ |

FIG.6

| PRINT SETTING | SOURCE DOCUMENT | TARGET DOCUMENT (BEFORE CHANGE) | TARGET DOCUMENT (AFTER CHANGE IS APPLIED) |
|---|---|---|---|
| TWO-SIDED PRINTING | ○ | × | ○ |
| STAPLING | ○ | × | ○ |
| PUNCHING | × | × | × |
| Z-FOLDING | ○ | × | ○ |

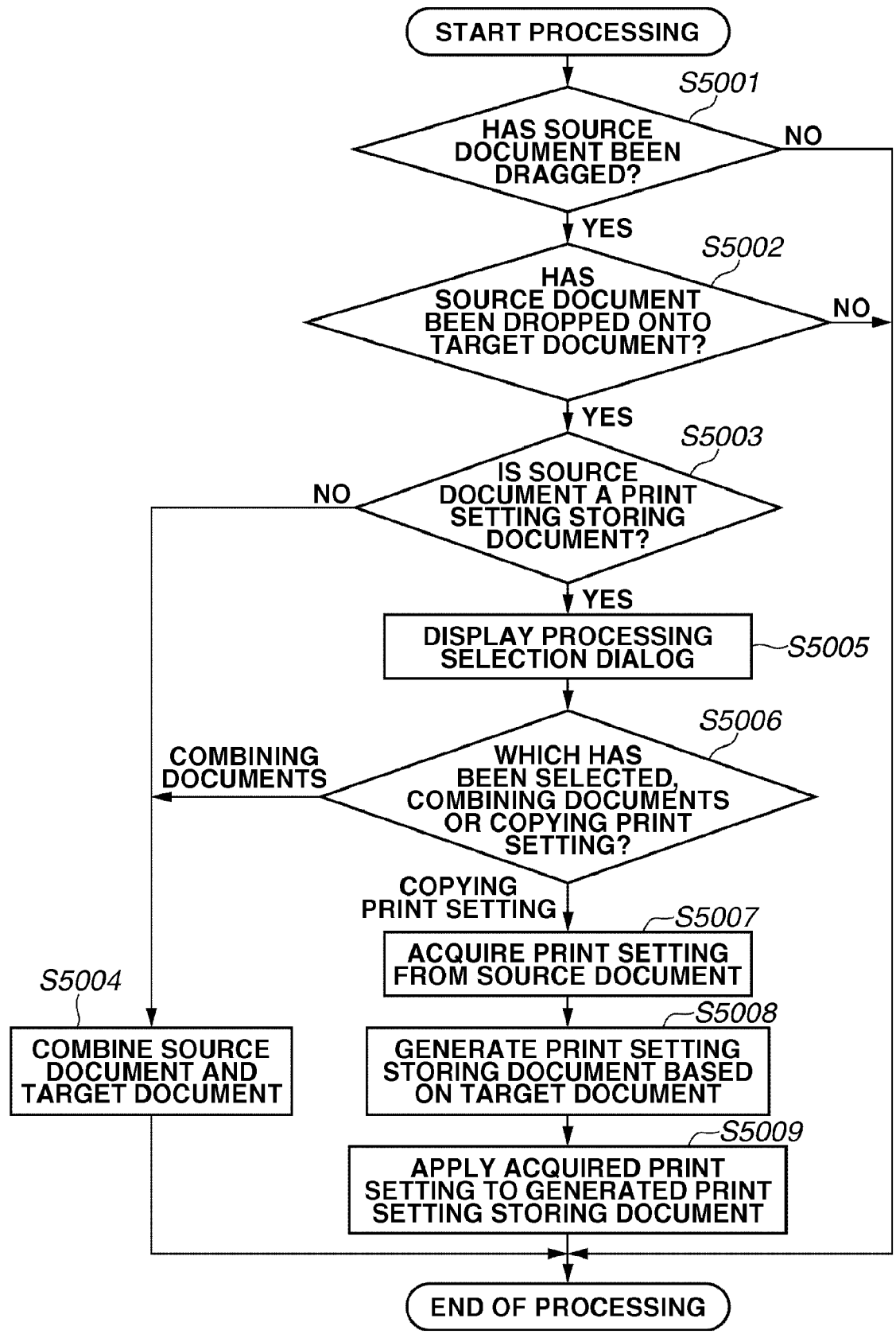

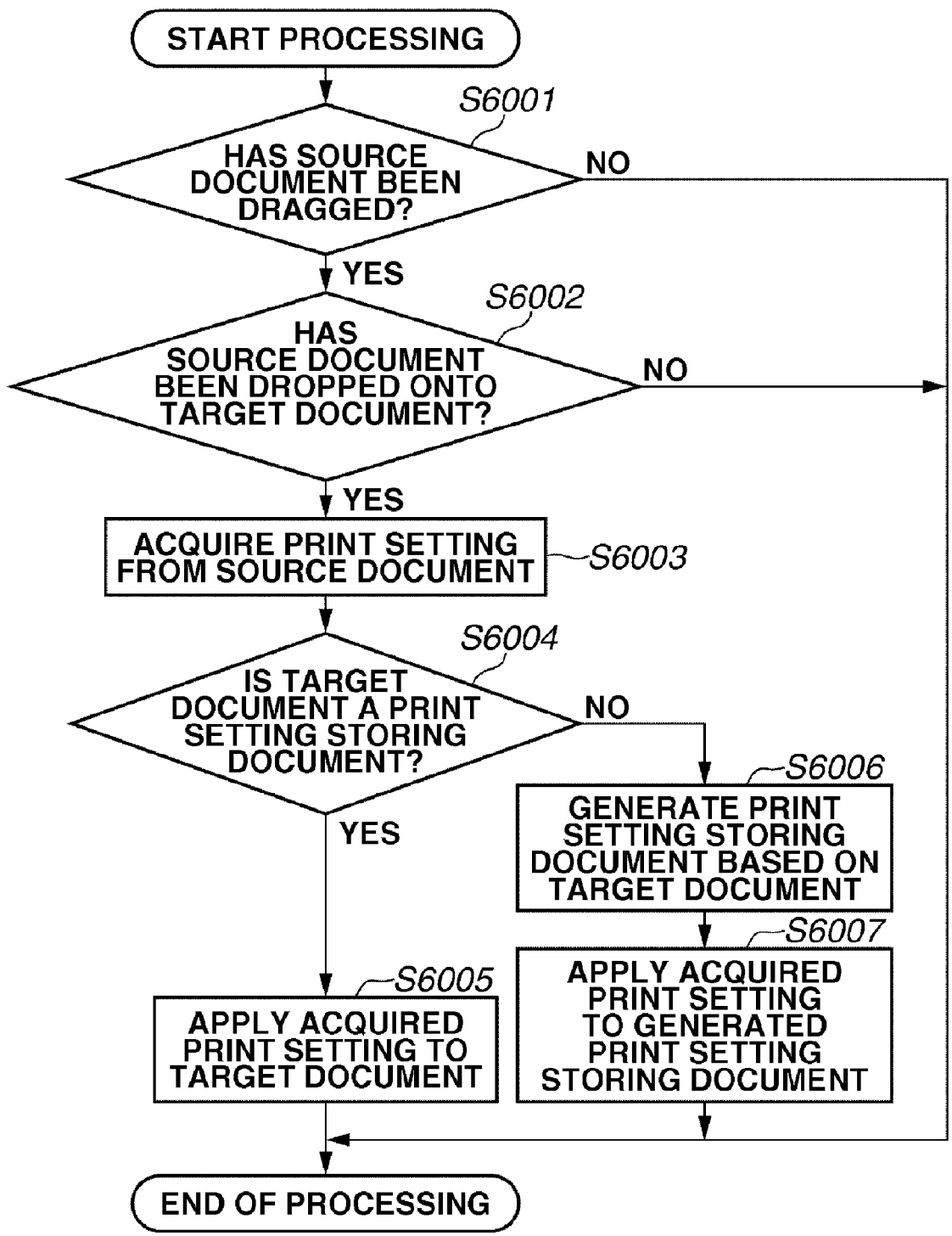

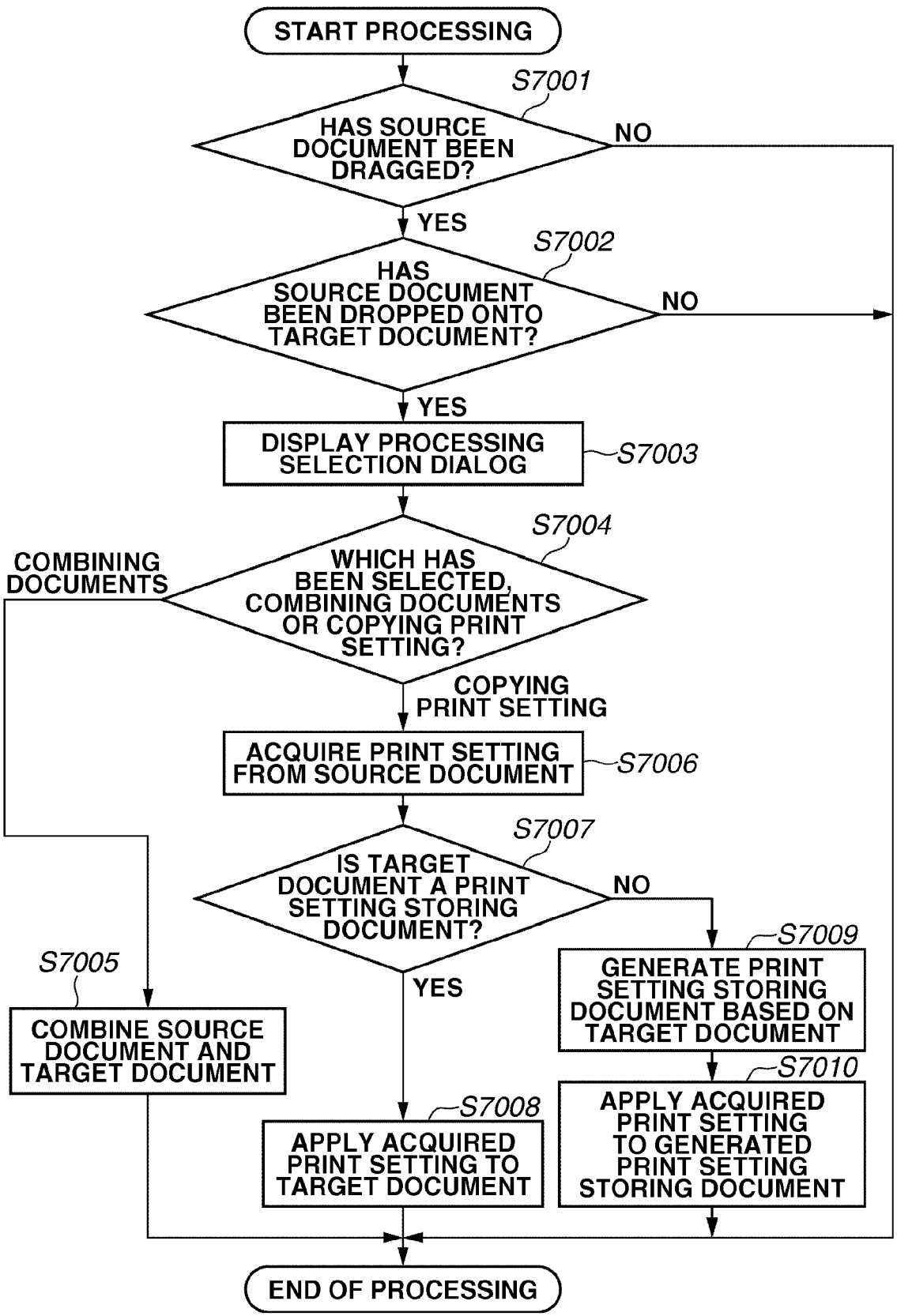

DOCUMENT MANAGEMENT APPARATUS AND METHOD APPLYING PRINT SETTINGS RESPONSIVE TO DRAGGING AND DROPPING DOCUMENT ICON

BACKGROUND OF THE INVENTION

1. Field of the Invention

The present invention relates to a document management apparatus, a document management method, and a computer-readable storage medium storing a computer program. More particularly, the present invention relates to a method for performing a print setting on a document.

2. Description of the Related Art

In recent years, as the informational society has become more and more sophisticated, it is widely performed to centrally manage electronic data and a paper document generated with a word processor application in a document management system.

Furthermore, a conventional method has been discussed for allowing a user to easily reprint a document by storing a print setting such as a bookbinding setting in a document so that the document can be more easily reutilized. The print setting is instruction information issued to a printer driver. More specifically, the print setting indicates a setting item to be set with respect to functions of a printer.

The above-described conventional method cannot store the print setting in an application document. That is, the document setting, such as paper size of the document, can be stored in an application document, but a bookbinding setting, such as setting for 2-in-1 printing, setting for stapling, and setting for punching, which are functions of a printer, cannot be stored in an application document.

In the case where a print setting cannot be stored in an application document as described above, it becomes necessary for a user to perform the above-described setting every time the user executes printing.

On the other hand, a document that can store a print setting can be easily reutilized because a user can easily reprint the document with the same print setting stored therein.

In this regard, Japanese Patent Application Laid-Open No. 2003-308200 discusses a method for increasing the usability of a document that can store a print setting by allowing a user to visually and easily verify a print setting by using a thumbnail.

Furthermore, Japanese Patent Application Laid-Open No. 2006-120041 discusses a method for converting document data into print data according to a specific print setting referred to with a setting icon for the specific print setting set on a specific printing apparatus in the case where it is detected that a user has drag-and-dropped the print setting icon onto a document file icon. Thus, the conventional method transmits a print job for printing the print data to the specific printing apparatus.

However, the method discussed in Japanese Patent Application Laid-Open No. 2003-308200 increases only the usability of a document itself. Therefore, in the case where a plurality of documents is managed in a document management system, it is difficult to increase the usability of the plurality of documents in the case of using the documents in association with one another.

More specifically, for example, according to the above-described conventional methods, a print setting that has been visually verified by the user cannot be set to another document. Furthermore, the method discussed in Japanese Patent Application Laid-Open No. 2006-120041 can apply to a document a predetermined bookbinding setting only. Accordingly, with the above-described conventional method, it is difficult to flexibly apply a print setting to a document.

Furthermore, with the above-described conventional method, it is difficult to allow the user to readily verify the print setting to be applied or reutilize the document to which the print setting has been applied.

SUMMARY OF THE INVENTION

The present invention is directed to a document management apparatus configured to allow a user to easily and flexibly perform and apply a print setting, such as a bookbinding setting, to a document.

According to an aspect of the present invention, a document management apparatus includes a receiving unit configured to receive a notification indicating that an icon for a first document has been drag-and-dropped onto an icon for a second document via a display screen, and an application unit configured to apply a print setting stored in the first document to the second document in response to the receiving unit receiving the notification indicating that the icon for the first document has been drag-and-dropped onto the icon for the second document.

According to another aspect of the present invention, a document management method includes receiving a notification indicating that an icon for a first document has been drag-and-dropped onto an icon for a second document via a display screen, and applying a print setting stored in the first document to the second document in response to receiving the notification indicating that the icon for the first document has been drag-and-dropped onto the icon for the second document.

According to an exemplary embodiment of the present invention, a print setting for a target document can be overwritten with a print setting for a source document by dragging an icon for the source document storing the print setting therein and dropping the source document icon onto an icon for the target document storing the print setting therein.

Thus, according to an exemplary embodiment of the present invention, the print setting can be copied by only dragging an icon for one print setting storage document and dropping the icon onto the other print setting storage document. Accordingly, an exemplary embodiment of the present invention can allow a user to easily generate a print setting storage document that can be reutilized with a simple operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 4 illustrates an example of a table storing a print setting for a source document and a print setting for a target document before and after the print setting for the source document is applied thereto according to the first exemplary embodiment of the present invention.

FIG. 6 illustrates an example of a table storing a print setting for a source document and a print setting for a target document before and after the print setting for the source document is applied thereto according to the second exemplary embodiment of the present invention.

FIG. 8 is a flow chart illustrating an example of an operation performed in the document management system in the case of applying a print setting for a specific document to another document according to a fourth exemplary embodiment of the present invention.

FIG. 9 is a flow chart illustrating an example of an operation performed in the document management system in the case of applying a print setting for a specific document to another document according to a fifth exemplary embodiment of the present invention.

FIG. 10 is a flow chart illustrating an example of an operation performed in the document management system in the case of applying a print setting for a specific document to another document according to a sixth exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
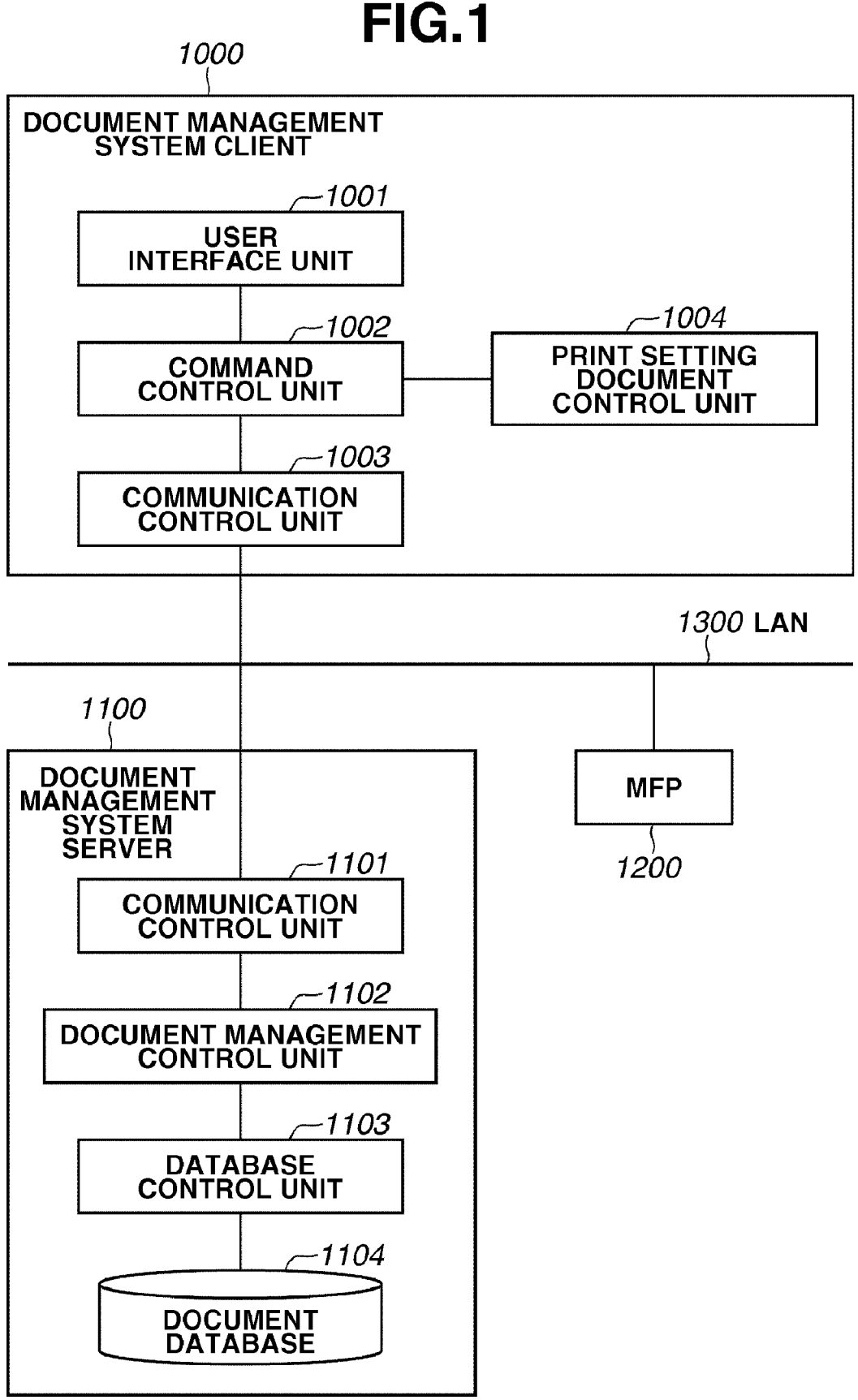
FIG. 1 illustrates an exemplary configuration of a document management system according to a first exemplary embodiment of the present invention.

FIG. 1 illustrates an exemplary configuration of a document management system according to a first exemplary embodiment of the present invention.

Referring to FIG. 1, the printing system includes a document management system client 1000, a document management system server 1100 and a multifunction peripheral (MFP) 1200. The document management system client 1000, the document management system server 1100, and the MFP 1200 can perform data communication with one another via a local area network (LAN) 1300.

Note that the document management system client 1000 and the document management system server 1100 each execute software operating on an operating system (OS) of a computer. Furthermore, the MFP 1200 includes a 2-in-1 print function, a two-sided print function, a stapling setting function, a punching function, and a Z-folding function, for example.

To begin with, the document management system client 1000 will be described in detail below. The document management system client 1000 includes a user interface unit 1001. The user interface unit 1001 receives an operation performed by a user and transmits a signal indicating the content of the user operation to a command control unit 1002.

Furthermore, the user interface unit 1001 displays a graphical user interface (GUI) based on the signal from the command control unit 1002. In addition, a document icon, which will be described in detail later below, is displayed by the user interface unit 1001.

The command control unit 1002 issues an instruction for executing the processing designated by the "user operation" performed via the user interface unit 1001 to a communication control unit 1003 and a print setting document control unit 1004. Furthermore, the command control unit 1002 transmits a signal generated based on a result of the processing to the user interface unit 1001 and the communication control unit 1003.

The communication control unit 1003 transmits the received signal to the document management system server 1100 according to the command from the command control unit 1002. Furthermore, the communication control unit 1003 receives the signal transmitted from the document management system server 1100.

In addition, when a print job for printing a document is generated based a print setting, which will be described in detail later below, the communication control unit 1003 transmits the generated print job for the document to the MFP 1200. After receiving the print job, the MFP 1200 outputs a document that has been processed based on the print setting included in the print job.

The print setting document control unit 1004 controls a print setting storage document (document file) that stores the print setting such as a bookbinding setting therein according to a command from the command control unit 1002. The communication control unit 1003 acquires data of the document, such as the print setting storage document, from the document management system server 1100.

Now, the document management system server 1100 will be described in detail below. The document management system server 1100 includes a communication control unit 1101. The communication control unit 1101 transmits a signal to the document management system client 1000 according to a command from a document management control unit 1102.

Furthermore, the communication control unit 1101 receives a signal that has been transmitted from the document management system client 1000.

The document management control unit 1102 issues an instruction for executing processing to a database control unit 1103 based on a processing request from the document management system client 1000.

The document management control unit 1102 sends a signal indicating a result of the processing performed by the database control unit 1103 to the document management system client 1000 via the communication control unit 1101.

The database control unit 1103 controls a document database 1104 according to a command from the document management control unit 1102. The document database 1104 stores documents and document information.

In the present exemplary embodiment, the database control unit 1103 acquires document data (the document and the document information) from the document database 1104 according to a document acquisition request from the document management system client 1000.

The communication control unit 1101 transmits the document data acquired with the database control unit 1103 to the document management system client 1000 according to an instruction from the document management control unit 1102.

Now, an exemplary hardware configuration of each of the document management system client 1000 and the document management system server 1100 will be described in detail below.

Figure 2:
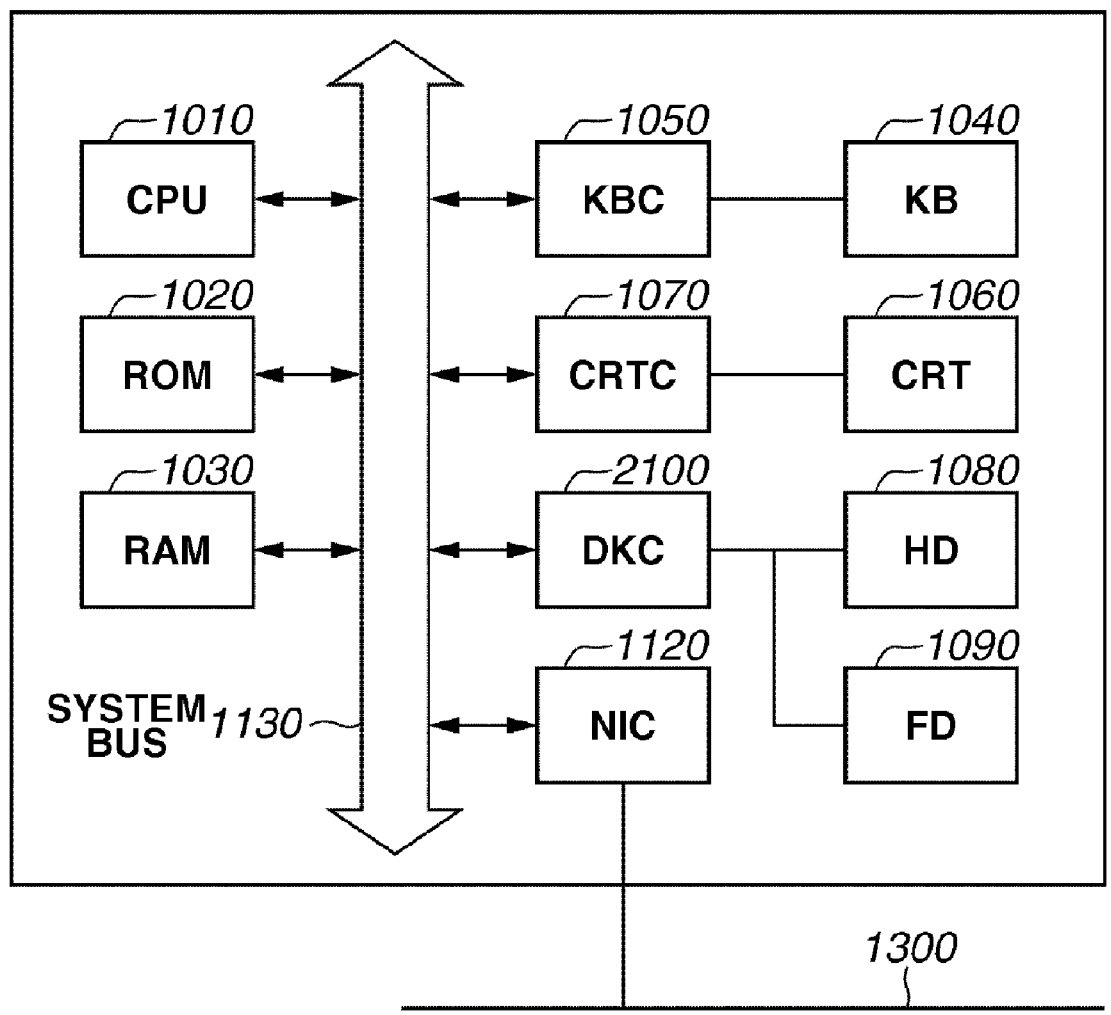
FIG. 2 illustrates an exemplary hardware configuration of a document management system client and a document management system server according to the first exemplary embodiment of the present invention.

FIG. 2 illustrates an exemplary hardware configuration of each of the document management system client 1000 and the document management system server 1100 according to the present exemplary embodiment.

Referring to FIG. 2, a central processing unit (CPU) 1010, a read-only memory (ROM) 1020, a random access memory (RAM) 1030, and a keyboard controller (KBC) 1050 of a keyboard (KB) 1040 are in communication with one another via a system bus 1130. In addition, a cathode ray tube (CRT) controller (CRTC) 1070 of a CRT display (CRT) 1060, which is a display unit, is connected to the system bus 1130.

Furthermore, a hard disk (HD) 1080 and a disk controller (DKC) 2100 for a floppy disk (FD) 1090 are connected to the system bus 1130. Moreover, a network interface controller (NIC) 1120 for connecting to the LAN 1300 is connected to the system bus 1130.

The CPU 1010 controls the entire operation of the above-described components connected to the system bus 1130 by executing software stored on the ROM 1020 or the HD 1080 or software supplied from the FD 1090.

That is, the CPU 1010 reads and executes a processing program that describes a predetermined processing sequence from the ROM 1020, the HD 1080, or the FD 1090 to execute control for implementing functions and operations of the present exemplary embodiment, which will be described in detail later below.

The RAM 1030 functions as a main memory or a work area of the CPU 1010. The KBC 1050 controls an instruction and an input issued by the user by operating the KB 1040 or a pointing device such as a mouse (not illustrated).

The CRTC 1070 controls a display by the CRT 1060. The DKC 2100 controls an access to the HD 1080 and the FD 1090, which respectively store a boot program, various applications, a file to be edited, a user file, a network management program, and a predetermined processing program according to the present exemplary embodiment. The NIC 1120 performs a bidirectional data communication with an apparatus or a system on the LAN 1300.

Now, an example of an operation performed in the document management system in the case of applying a print setting for a specific document to another document will be described in detail below with reference to the flow chart in FIG. 3.

Figure 3:
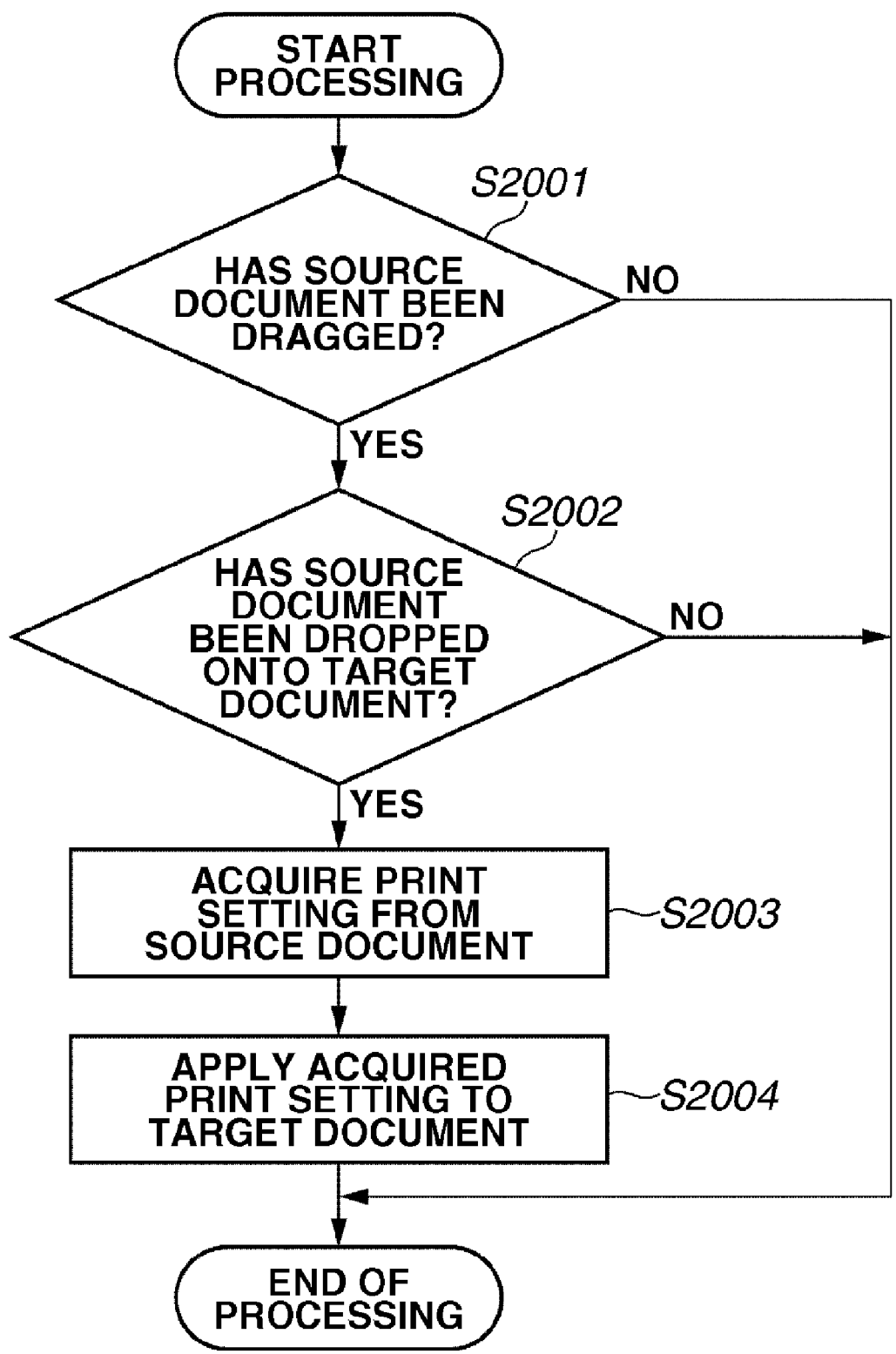
FIG. 3 is a flow chart illustrating an example of an operation performed in the document management system in the case of applying a print setting for a specific document to another document according to the first exemplary embodiment of the present invention.

In the example in FIG. 3, processing to be performed after icons for at least two bookbinding setting storage documents are displayed on a display screen of the display apparatus (the CRT 1060) of the document management system client 1000 is illustrated.

Referring to FIG. 3, in step S2001, the user interface unit 1001 determines whether an icon for a print setting storage document (a document DocA) has been dragged (selected) by the user operation.

The print setting storage document (the document DocA) is a source document storing therein the print setting (a change source print setting) that the user desires to apply.

If it is determined as a result of the determination in step S2001 that the icon for the print setting storage document (the document DocA) has not been dragged (selected) by the user operation (NO in step S2001), then the processing according to the flow chart in FIG. 3 ends.

On the other hand, if it is determined in step S2001 that the icon for the print setting storage document has been dragged (selected) by the user operation (YES in step S2001), then the processing advances to step S2002.

In step S2002, the user interface unit 1001 determines whether the icon for the source document dragged in step S2001 has been dropped onto an icon for a print setting storage document (a document DocB) by the user operation.

The print setting storage document (the document DocB) is the target document storing therein the print setting (a change target print setting) to which the print setting has been applied.

As described above, in the present exemplary embodiment, an exemplary receiving unit is implemented by performing the processing performed in steps S2001 and S2002. Furthermore, in the present exemplary embodiment, the source document is an example of a first document while the target document is an example of a second document.

If it is determined as a result of the determination in step S2202 that the icon for the source document dragged in step S2001 has not been dropped onto the icon for a print setting storage document (the document DocB) by the user operation (NO in step S2202), then the processing according to the flow chart in FIG. 3 ends.

On the other hand, if it is determined in step S2002 that the icon for the source document dragged in step S2001 has been dropped onto the icon for a print setting storage document (the document DocB) by the user operation (YES in step S2202), then the processing advances to step S2003.

In step S2003, the command control unit 1002 issues an instruction for acquiring the print setting (for example, the bookbinding setting) in the source document to the print setting document control unit 1004.

By performing the above-described processing, the print setting document control unit 1004 acquires the print setting for the source document.

In step S2004, the command control unit 1002 issues an instruction for applying the print setting acquired in step S2003 to the target document to the print setting document control unit 1004.

By performing the above-described processing, the print setting document control unit 1004 applies the print setting for the source document to the target document. In applying the print setting for the source document to the target document, the print setting document control unit 1004 applies the print setting for the source document to the target document after discarding all the print settings that have been set on the target document.

By performing the above-described processing, the print setting stored on the source document corresponding to the drag-and-dropped icon is applied to the target document. Then, the processing according to the flow chart in FIG. 3 ends.

As described above, in the present exemplary embodiment, an exemplary application unit is implemented by performing the processing in step S2003 and step S2004.

In addition, in the present exemplary embodiment, the source document is an example of one document, while the target document is an example of the other document.

Note that in the case where the print setting for the source document has been applied to the target document in the above-described manner, the icon for the source document is displayed at the position designated by the dragging, while the icon for the target document does not change. However, the present exemplary embodiment is not limited to this.

That is, it is also useful, for example, if a color, a shape, a size, or a pattern, for example, of the icon for the target document is changed. In addition, it is also useful if the icon for the source document is deleted in the case where the source document is discarded.

FIG. 4 illustrates an example of a table storing a print setting for a source document and a print setting for a target document before and after the print setting for the source document is applied thereto according to the present exemplary embodiment.

Referring to FIG. 4, a sign "o" indicates that the print setting is valid. A sign "x" indicates that the print setting is invalid. As illustrated in FIG. 4, the current print setting set for the target document is overwritten with the print setting for the source document.

As described above, in the present exemplary embodiment, the print setting for the target document is overwritten with the print setting for the source document by dragging the icon for the source document storing the print setting therein and dropping the dragged source document icon onto the icon for the target document storing the print setting therein.

With the above-described configuration, the present exemplary embodiment can allow the user to perform copying the print setting just by performing the drag-and-drop operation between two print setting storage document icons. Thus, the user can generate a print setting storage document that can be reutilized with a simple operation.

Furthermore, the user can select as freely as possible a change source print setting and a change target print setting by selecting a desired icon from among a plurality of "print setting storage document icons". With the above-described configuration, the present exemplary embodiment can allow the user to perform the print setting, such as the bookbinding setting, more flexibly than in the conventional method.

In the present exemplary embodiment, only the icons for the print setting storage documents (the source document and the target document) are displayed. However, the present exemplary embodiment is not limited to this.

That is, it is also useful if an image indicating the print setting stored in the corresponding print setting storage document is displayed on or within or at a position peripheral to the icon for the print setting storage document (the source document and the target document).

With the above-described configuration, the present exemplary embodiment can allow the user to more easily recognize the print setting stored in the print setting storage document.

Furthermore, in the present exemplary embodiment, the document management system client 1000 reads a document stored within the document management system server 1100 and the icon for the document is displayed on the document management system client 1000. However, the present exemplary embodiment is not limited to this.

That is, it is also useful, for example, if the icon for the document stored on the HD 1080 of the document management system client 1000 is displayed and the above-described processing according to the present exemplary embodiment is performed on the document.

In addition, in the present exemplary embodiment, the source document is drag-and-dropped onto the target document. However, the present exemplary embodiment is not limited to this. That is, it is also useful if the target document is dragged and then dropped onto the source document.

Even in the above-described case, the print setting for the target document is overwritten with the print setting for the source document.

Now, a second exemplary embodiment of the present invention will be described in detail below. In the above-described first exemplary embodiment, both the source document and the target document are used as the print setting storage documents that store the print setting therein.

On the other hand, in the present exemplary embodiment, the target document is a bookbinding setting non-storage document that does not (or cannot) store therein the print setting. As described above, the second exemplary embodiment is different from the first exemplary embodiment in the points that the target document according to the second exemplary embodiment does not (or cannot) store the print setting therein and the processing according to the present exemplary embodiment differs from that in the first exemplary embodiment.

Accordingly, in the present exemplary embodiment, the units and components that are the same as those in the first exemplary embodiment are provided with the same reference numerals and symbols illustrated in FIGS. 1 through 4. Therefore, the description thereof will not be repeated here.

Figure 5:
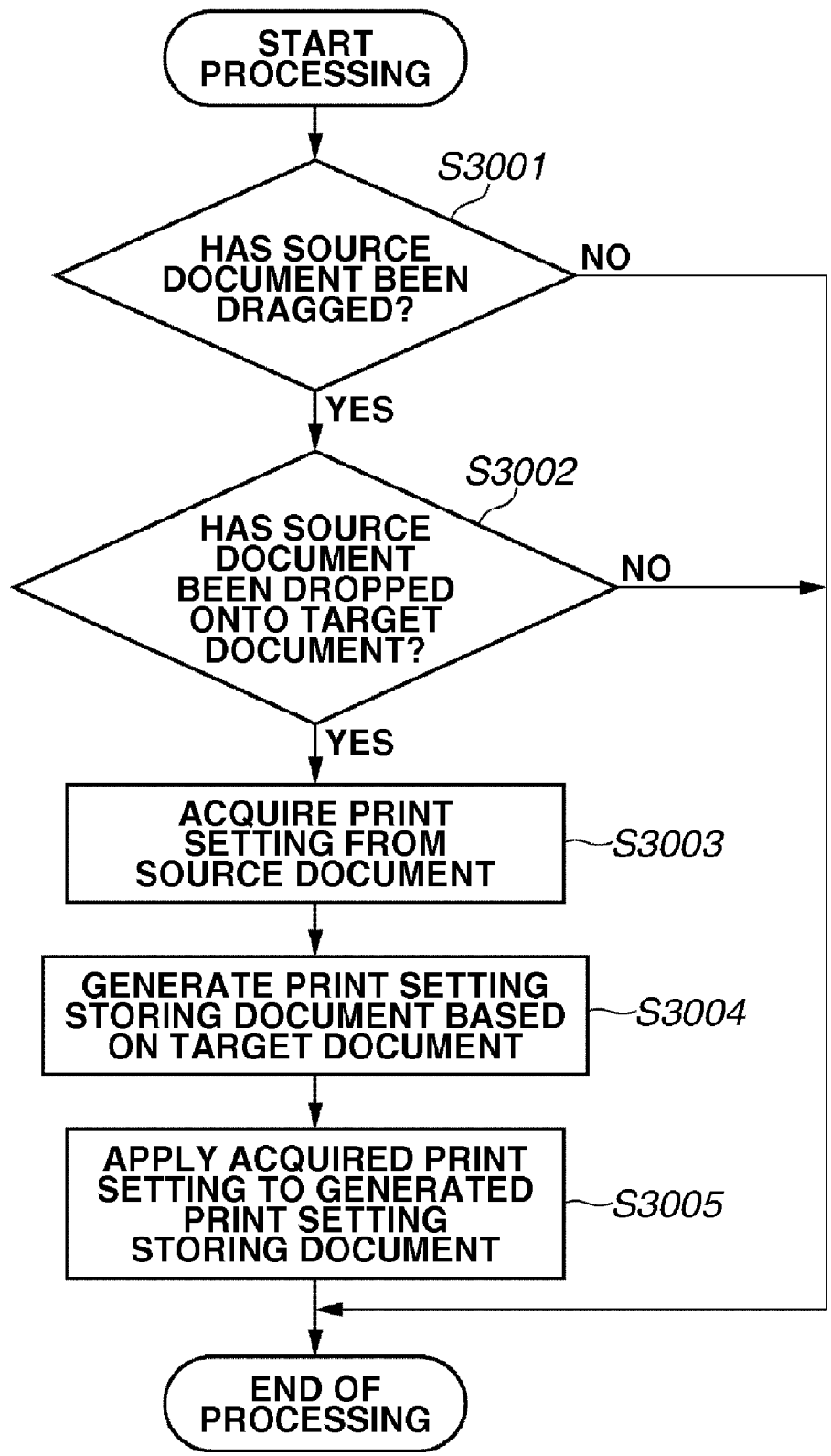
FIG. 5 is a flow chart illustrating an example of an operation performed in the document management system in the case of applying a print setting for a specific document to another document according to a second exemplary embodiment of the present invention.

FIG. 5 is a flow chart illustrating an example of an operation performed in the document management system in the case of applying the print setting for a specific document to another document according to the present exemplary embodiment.

Note that in the example in FIG. 5 also, as in FIG. 3, the processing performed after the icons for at least two documents are displayed on the display screen of the display apparatus (the CRT 1060) of the document management system client 1000 is illustrated.

Referring to FIG. 5, in step S3001, the user interface unit 1001 determines whether an icon for the print setting storage document (the document DocA) has been dragged (selected) by the user operation.

The print setting storage document (the document DocA) is the source document storing therein the print setting (the change source print setting) that the user desires to apply.

If it is determined as a result of the determination in step S3001 that the icon for the print setting storage document (the document DocA) has not been dragged (selected) by the user operation (NO in step S3001), then the processing according to the flow chart in FIG. 5 ends.

On the other hand, if it is determined in step S3001 that the icon for the print setting storage document (a document DocA) has been dragged (selected) by the user operation (YES in step S3001), then the processing advances to step S3002.

In step S3002, the user interface unit 1001 determines whether the icon for the source document dragged in step S3001 has been dropped onto the icon for the bookbinding setting non-storage document (a document DocB) by the user operation.

The bookbinding setting non-storage document (the document DocB) is a target document that does not store therein the print setting.

As described above, in the present exemplary embodiment, an exemplary receiving unit is implemented by performing the processing performed in steps S3001 and S3002.

Furthermore, in the present exemplary embodiment, the source document is an example of the first document while the target document is an example of a second document.

If it is determined as a result of the determination in step S3002 that the icon for the source document dragged in step S3001 has not been dropped onto the icon for the target document (the bookbinding setting non-storage document (the document DocB)) by the user operation (NO in step S3002), then the processing according to the flow chart in FIG. 5 ends.

On the other hand, if it is determined in step S3002 that the icon for the source document dragged in step S3001 has been dropped onto the icon for the target document by the user operation (YES in step S3002), then the processing advances to step S3003.

In step S3003, the command control unit 1002 issues an instruction for acquiring the print setting (for example, the bookbinding setting) stored in the source document to the print setting document control unit 1004.

By performing the above-described processing, the print setting document control unit 1004 acquires the print setting for the source document.

In step S3004, the command control unit 1002 issues an instruction for generating a print setting storage document that can store therein the print setting based on the target document to the print setting document control unit 1004.

After receiving the instruction from the command the control unit 1002, the print setting document control unit 1004 generates a print setting storage document (a document DocB') based on the target document. After the processing is completed, it is enabled to store the print setting in the target document.

In step S3005, the command control unit 1002 issues an instruction for applying the print setting acquired in step S3003 to the print setting storage document generated in step S3004 to the print setting document control unit 1004.

By performing the processing in step S3005, the print setting document control unit 1004 applies the print setting acquired in step S3003 to the print setting storage document generated in step S3004.

The print setting stored in the source document corresponding to the drag-and-dropped icon is applied to the target document in the above-described manner. Then, the processing according to the flow chart in FIG. 5 ends.

As described above, in the present exemplary embodiment, an exemplary application unit is implemented by performing the processing in steps S3003 through S3005.

Furthermore, in the present exemplary embodiment, the source document is an example of one document, while the target document is an example of the other document.

FIG. 6 illustrates an example of a table storing a print setting for a source document and a print setting for a target document before and after the print setting for the source document is applied thereto.

Referring to FIG. 6, a sign "o" indicates that the print setting is valid while a sign "x" indicates that the print setting is invalid as in FIG. 4.

As illustrated in FIG. 6, the print setting for the source document is applied to the target document.

As described above, even in the case where the target document is a bookbinding setting non-storage document, the function according to the first exemplary embodiment can be implemented. Note that in the present exemplary embodiment, a modification described above in the first exemplary embodiment can be employed.

More specifically, it is also useful if an image indicating that no print setting has been set is displayed on or within or at a position peripheral to the bookbinding setting non-storage document. In addition, it is also useful if it is notified to the user that the document is the bookbinding setting non-storage document by displaying the icon for the bookbinding setting non-storage document with its color, size, or shape different from that of the icon for the print setting storage document.

Now, a third exemplary embodiment of the present invention will be described in detail below. In the second exemplary embodiment, the source document is the print setting storage document while the target document is the bookbinding setting non-storage document. On the other hand, in the present exemplary embodiment, different processing is performed based on whether the source document is the print setting storage document or the bookbinding setting non-storage document.

That is, the present exemplary embodiment is different from the second exemplary embodiment in the point that the processing determined based on the type of the source document is executed.

Note here that in the present exemplary embodiment, the units and components that are the same as those in the first and the second exemplary embodiments are provided with the same reference numerals and symbols illustrated in FIGS. 1 through 6. Therefore, the description thereof will not be repeated here.

In the present exemplary embodiment, when the user drag-and-drops one bookbinding setting non-storage document onto another bookbinding setting non-storage document, the document management system combines the bookbinding setting non-storage documents.

Figure 7:
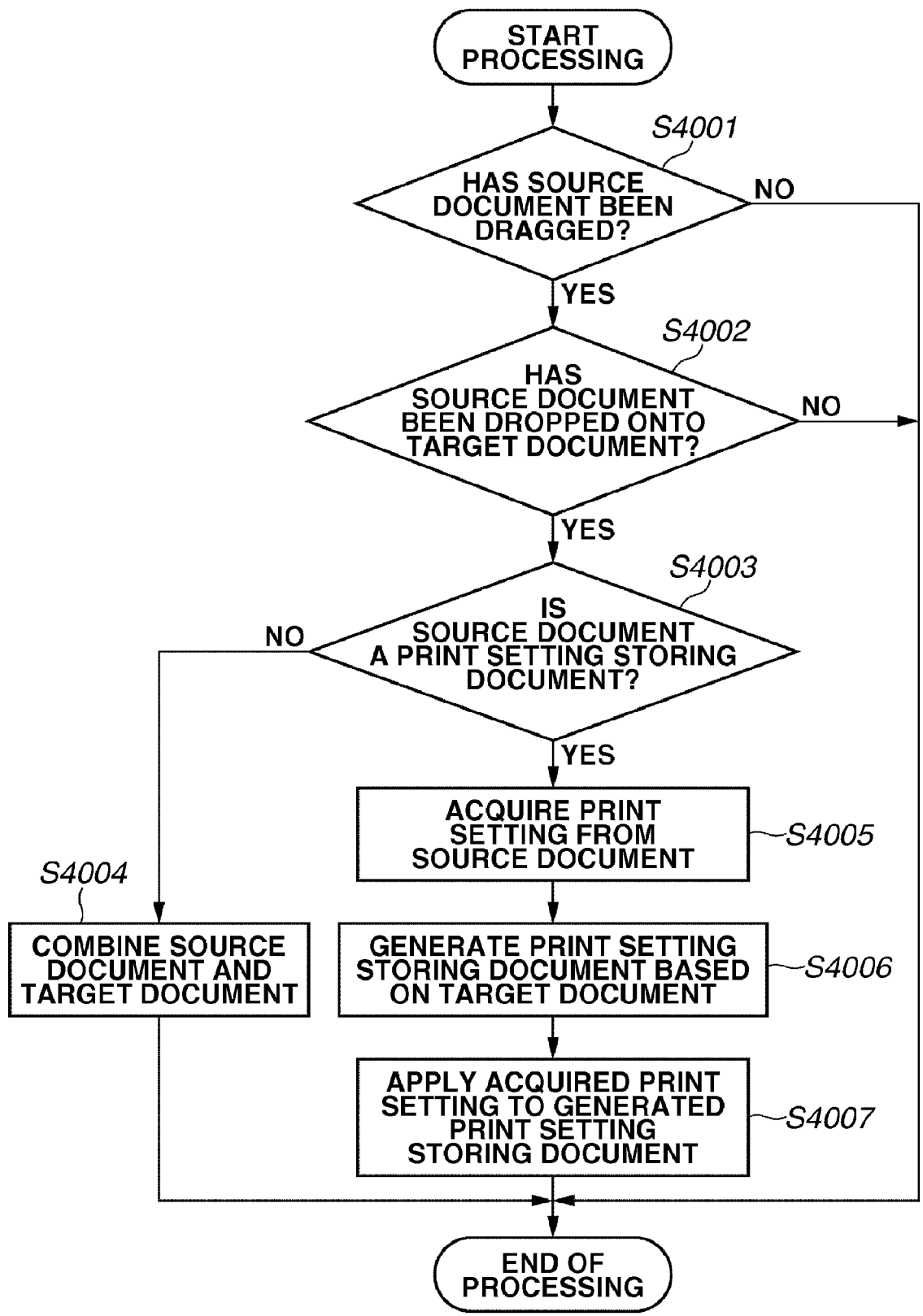
FIG. 7 is a flow chart illustrating an example of an operation performed in the document management system in the case of applying a print setting for a specific document to another document according to a third exemplary embodiment of the present invention.

FIG. 7 is a flow chart illustrating an example of an operation performed in the document management system in the case of applying the print setting for a specific document to another document according to the present exemplary embodiment.

Note that in the example in FIG. 7, as in FIGS. 3 and 5, the processing to be performed after icons for at least two documents are displayed on the display screen of the display apparatus (the CRT 1060) of the document management system client 1000 is illustrated.

Referring to FIG. 7, in step S4001, the user interface unit 1001 determines whether the icon for the source document (a document DocA) has been dragged (selected) by the user operation.

If it is determined as a result of the determination in step S4001 that the icon for the source document (the document DocA) has not been dragged (selected) by the user operation (NO in step S4001), then the processing according to the flow chart in FIG. 7 ends.

On the other hand, if it is determined in step S4001 that the icon for the source document (the document DocA) has been dragged (selected) by the user operation (YES in step S4001), then the processing advances to step S4002.

In step S4002, the user interface unit 1001 determines whether the icon for the source document dragged in step S4001 has been dropped onto the icon for the bookbinding setting non-storage document (a document DocB) by the user operation.

The bookbinding setting non-storage document (the document DocB) is the target document that does not store therein the print setting.

As described above, in the present exemplary embodiment, an exemplary receiving unit is implemented by performing the processing performed in steps S4001 and S4002.

Furthermore, in the present exemplary embodiment, the source document is an example of the first document, while the target document is an example of the second document.

If it is determined as a result of the determination in step S4002 that the icon for the source document dragged in step S4001 has not been dropped onto the icon for the target document (the bookbinding setting non-storage document (the document DocB)) by the user operation (NO in step S4002), then the processing according to the flow chart in FIG. 7 ends.

On the other hand, if it is determined in step S4002 that the icon for the source document dragged in step S4001 has been dropped onto the icon for the target document (the document DocB) by the user operation (YES in step S4002), then the processing advances to step S4003.

In step S4003, the command control unit 1002 acquires information about the source document dragged in step S4001 from the print setting document control unit 1004. Furthermore, the command control unit 1002 determines whether the source document dragged in step S4001 is the print setting storage document according to the acquired information.

As described above, in the present exemplary embodiment, an exemplary detection unit is implemented by performing the processing in step S4003.

If it is determined as a result of the determination in step S4003 that the source document dragged in step S4001 is not the print setting storage document (NO in step S4003), then the processing advances to step S4004.

In this case, both the target document and the source document are bookbinding setting non-storage documents. Accordingly, in step S4004, the command control unit 1002 issues an instruction for combining the source document dragged in step S4001 and the target document subjected to dropping in step S4002 to the print setting document control unit 1004. In addition, the print setting document control unit 1004 generates a new bookbinding setting non-storage document (a document DocC). Then, the processing according to the flow chart in FIG. 7 ends.

On the other hand, if it is determined in step S4003 that the source document dragged in step S4001 is the print setting storage document (YES in step S4003), then the processing advances to step S4005.

In step S4005, the command control unit 1002 issues an instruction for acquiring the print setting (for example, the bookbinding setting) in the source document to the print setting document control unit 1004.

By performing the above-described processing, the print setting document control unit 1004 acquires the print setting for the source document.

In step S4006, the command control unit 1002 instructs the print setting document control unit 1004 to generate a print setting storage document that can store therein the print setting based on the target document.

By performing the above-described processing, the print setting document control unit 1004 generates the print setting storage document (the document DocB') based on the target document. After the processing is completed, it becomes enabled to store the print setting in the target document.

In step S4007, the command control unit 1002 issues an instruction for applying the print setting acquired in step S4005 to the print setting storage document generated in step S4006 to the print setting document control unit 1004.

By performing the above-described processing, the print setting document control unit 1004 applies the print setting acquired in step S4005 to the print setting storage document generated in step S4006. The print setting stored on the source document corresponding to the drag-and-dropped icon is applied to the target document in the above-described manner. Then, the processing according to the flow chart in FIG. 7 ends.

As described above, in the present exemplary embodiment, an exemplary application unit is implemented by performing the processing performed in steps S4005 through S4007. Furthermore, in the present exemplary embodiment, the source document is an example of one document, while the target document is an example of the other document.

As described above, in the present exemplary embodiment, in the case where the source document does not (or cannot) store the print setting, the target document is combined with the source document.

On the other hand, in the case where the source document stores the print setting, the present exemplary embodiment generates a print setting storage document based on the target document. In addition, the print setting for the source document is applied to the print setting storage document.

With the above-described configuration, the present exemplary embodiment, as well as being capable of implementing the above-described functions of the first and the second exemplary embodiments, can allow the user to generate a new print setting storage document by performing a drag-and-drop operation by applying the print setting for the print setting storage document to the print setting non-storage document (bookbinding setting non-storage document) only In the case where it is determined necessary according to the type of the source document. Note that in the present exemplary embodiment, the modification described in the first and the second exemplary embodiments can be employed.

Now, a fourth exemplary embodiment of the present invention will be described in detail below. In the above-described third exemplary embodiment, in the case where the source document is the print setting storage document, the print setting for the source document is applied to the target document.

On the other hand, in the present exemplary embodiment, in the case where the source document is the print setting storage document, the user selects whether to apply the print setting for the source document to the target document or to combine the source document and the target document.

As described above, the present exemplary embodiment is different from the above-described first through the third exemplary embodiments with respect to the processing performed in the document management system in the case where the source document is the print setting storage document.

Accordingly, in the present exemplary embodiment, the units and components that are the same as those in the first through the third exemplary embodiments are provided with the same reference numerals and symbols illustrated in FIGS. 1 through 7. Therefore, the description thereof will not be repeated here.

FIG. 8 is a flow chart illustrating an example of an operation performed in the document management system in the case of applying the print setting for a specific document to another document according to the present exemplary embodiment.

Note that in the example illustrated in FIG. 8 also, as in FIGS. 3, 5, and 7, the processing to be performed after icons for at least two documents are displayed on the display screen of the display apparatus (the CRT 1060) of the document management system client 1000 is illustrated.

Referring to FIG. 8, in step S5001, the user interface unit 1001 determines whether the icon for the source document (a document DocA) has been dragged (selected) by the user operation.

If it is determined as a result of the determination in step S5001 that the icon for the source document (the document DocA) has not been dragged (selected) by the user operation (NO in step S5001), then the processing according to the flow chart in FIG. 8 ends.

On the other hand, if it is determined in step S5001 that the icon for the source document (the document DocA) has been dragged (selected) by the user operation (YES in step S5001), then the processing advances to step S5002.

In step S5002, the user interface unit 1001 determines whether the icon for the source document dragged in step S5001 has been dropped onto the icon for the bookbinding setting non-storage document (a document DocB) by the user operation.

The bookbinding setting non-storage document (the document DocB) is the target document that does not store therein the print setting.

As described above, in the present exemplary embodiment, an exemplary receiving unit is implemented by performing the processing performed in steps S5001 and S5002.

Furthermore, in the present exemplary embodiment, the source document is an example of the first document, while the target document is an example of the second document.

On the other hand, if it is determined as a result of the determination in step S5002 that the icon for the source document dragged in step S5001 has not been dropped onto the icon for the target document (the document DocB) by the user operation (NO in step S5002), then the processing according to the flow chart in FIG. 8 ends.

On the other hand, if it is determined in step S5002 that the icon for the source document dragged in step S5001 has been dropped onto the icon for the target document (the document DocB) by the user operation (YES in step S5002), then the processing advances to step S5003.

In step S5003, the command control unit 1002 acquires information about the source document dragged in step S5001 from the print setting document control unit 1004. Furthermore, the command control unit 1002 determines whether the source document dragged in step S5001 is the print setting storage document according to the acquired information.

As described above, in the present exemplary embodiment, an exemplary detection unit is implemented by performing the processing in step S5003.

If it is determined as a result of the determination in step S5003 that the source document dragged in step S5001 is not the print setting storage document (NO in step S5003), then the processing advances to step S5004.

In this case, both the target document and the source document are bookbinding setting non-storage documents.

Accordingly, in step S5004, the command control unit 1002 issues an instruction for combining the source document dragged in step S5001 and the target document subjected to dropping in step S5002 to the print setting document control unit 1004.

By performing the above-described processing, the print setting document control unit 1004 combines the source document dragged in step S5001 and the target document subjected to dropping in step S5002 and generates a new bookbinding setting non-storage document (a document DocC). Then, the processing according to the flow chart in FIG. 8 ends.

On the other hand, if it is determined in step S5003 that the source document dragged in step S5001 is the print setting storage document (YES in step S5003), then the processing advances to step S5005.

In step S5005, the command control unit 1002 instructs the user interface unit 1001 to display a processing selection dialog. The processing selection dialog is a GUI that allows the user to perform the selection as to which of combining the source document and the target document and applying (copying) the print setting for the source document to the target document is to be executed.

The user interface unit 1001 displays the processing selection dialog according to the instruction from the command control unit 1002.

In step S5006, the command control unit 1002 determines which of combining the source document and the target document and applying the print setting for the source document to the target document has been selected by the user according to a signal from the user interface unit 1001.

As described above, in the present exemplary embodiment, an exemplary determination unit is implemented by performing the processing in step S5006.

If it is determined as a result of the determination in step S5006 that the user has selected combining the source document and the target document, then the processing advances to step S5004. In step S5004, the command the control unit 1002 combines the source document and the target document. Then, the processing according to the flow chart in FIG. 8 ends.

On the other hand, if it is determined in step S5006 that the user has selected applying the print setting for the source document to the target document, then the processing advances to step S5007. In step S5007, the command control unit 1002 issues an instruction for acquiring the print setting (for example, the bookbinding setting) in the source document to the print setting document control unit 1004.

By performing the above-described processing, the print setting document control unit 1004 acquires the print setting for the source document.

In step S5008, the command control unit 1002 instruct the print setting document control unit 1004 to generate a print setting storage document that can store therein the print setting from the target document.

By performing the above-described processing, the print setting document control unit 1004 generates the print setting storage document (a document DocB') based on the target document. After the processing is completed, it becomes enabled to store the print setting in the target document.

In step S5009, the command control unit 1002 issues an instruction for applying the print setting acquired in step S5007 to the print setting storage document generated in step S5008 to the print setting document control unit 1004. By performing the above-described processing, the print setting document control unit 1004 applies the print setting acquired in step S5007 to the print setting storage document generated in step S5008.

The print setting stored on the source document corresponding to the drag-and-dropped icon is applied to the target document in the above-described manner. Then, the processing according to the flow chart in FIG. 8 ends.

As described above, in the present exemplary embodiment, an exemplary application unit is implemented by performing the processing in steps S5007 through S5009.

Furthermore, in the present exemplary embodiment, the source document is an example of one document, while the target document is an example of the other document.

As described above, in the present exemplary embodiment, in the case where the source document does not or cannot store the print setting, the target document is combined with the source document.

On the other hand, in the case where the source document stores the print setting, the present exemplary embodiment allows the user to select between combining the source document and the target document and applying the print setting for the source document to the target document. In this case, the present exemplary embodiment executes the above-described processing according to the content of the user selection.

With the above-described configuration, the present exemplary embodiment, as well as being capable of implementing the above-described functions of the first through the third exemplary embodiments, can allow the user to execute the desired processing by merely performing a drag-and-drop operation. Note that in the present exemplary embodiment, a modification described in the first and the second exemplary embodiments can be employed.

Now, a fifth exemplary embodiment of the present invention will be described in detail below. In the above-described first through the fourth exemplary embodiments, the target document is either the print setting storage document or the bookbinding setting non-storage document.

On the other hand, in the present exemplary embodiment, the content of the processing differs according to which of the print setting storage document or bookbinding setting non-storage document the target document is.

More specifically, the present exemplary embodiment is different from the above-described first through the fourth exemplary embodiments in the point that the present exemplary embodiment performs the processing according to the type of the target document.

Accordingly, in the present exemplary embodiment, the units and components that are the same as those in the first through the fourth exemplary embodiments are provided with the same reference numerals and symbols illustrated in FIGS. 1 through 8. Therefore, the description thereof will not be repeated here.

FIG. 9 is a flow chart illustrating an example of an operation performed in the document management system in the case of applying the print setting for a specific document to another document according to the present exemplary embodiment.

Note that in the example in FIG. 9, as in FIGS. 3, 5, 7, and 8, processing to be performed after icons for at least two documents are displayed on the display screen of the display apparatus (the CRT 1060) of the document management system client 1000 is illustrated.

Referring to FIG. 9, in step S6001, the user interface unit 1001 determines whether the icon for the print setting storage document (a document DocA) has been dragged (selected) by the user operation. The print setting storage document (the document DocA) is the source document storing therein the print setting (the change source print setting) that the user desires to apply.

If it is determined as a result of the determination in step S6001 that the icon for the source document (the print setting storage document (the document DocA)) has not been dragged (selected) by the user operation (NO in step S6001), then the processing according to the flow chart in FIG. 9 ends.

On the other hand, if it is determined in step S6001 that the icon for the source document (the document DocA) has been dragged (selected) by the user operation (YES in step S6001), then the processing advances to step S6002.

In step S6002, the user interface unit 1001 determines whether the icon for the source document dragged in step S6001 has been dropped onto the icon for the target document (a document DocB) by the user operation.

As described above, in the present exemplary embodiment, an exemplary receiving unit is implemented by performing the processing in steps S6001 and S6002. Furthermore, in the present exemplary embodiment, the source document is an example of the first document, while the target document is an example of the second document.

If it is determined as a result of the determination in step S6002 that the icon for the source document dragged in step S6001 has not been dropped onto the icon for the target document (the document DocB) by the user operation (NO in step S6002), then the processing according to the flow chart in FIG. 9 ends.

On the other hand, if it is determined in step S6002 that the icon for the source document dragged in step S6001 has been dropped onto the icon for the target document (the document DocB) by the user operation (YES in step S6002), then the processing advances to step S6003.

In step S6003, the command control unit 1002 issues an instruction for acquiring the print setting (for example, the bookbinding setting) in the source document to the print setting document control unit 1004.

By performing the above-described processing, the print setting document control unit 1004 acquires the print setting for the source document.

In step S6004, the command control unit 1002 acquires information about the target document subjected to dropping in step S6002 from the print setting document control unit 1004. Furthermore, the command control unit 1002 determines whether the target document subjected to dropping in step S6002 is the print setting storage document according to the acquired information.

As described above, in the present exemplary embodiment, an exemplary second determination unit is implemented by performing the processing in step S6004.

If it is determined as a result of the determination in step S6004 that the target document subjected to dropping in step S6002 is the print setting storage document (YES in step S6004), then the processing advances to step S6005.

In step S6005, the command control unit 1002 issues an instruction for applying the print setting acquired in step S6003 to the target document to the print setting document control unit 1004. By performing the above-described processing, the print setting document control unit 1004 applies the print setting for the source document to the target document.

In performing the processing in step S6005, the print setting document control unit 1004 applies the print setting for the source document to the target document after discarding all the print settings that have been set for the target document.

The print setting stored on the source document corresponding to the drag-and-dropped icon is applied to the target document in the above-described manner. Then, the processing according to the flow chart in FIG. 9 ends.

On the other hand, if it is determined in step S6004 that the target document subjected to dropping in step S6002 is not the print setting storage document (NO in step S6004), then the processing advances to step S6006.

In step S6006, the command control unit 1002 issues an instruction for generating a print setting storage document that can store therein the print setting from the target document to the print setting document control unit 1004.

By performing the above-described processing, the print setting document control unit 1004 generates the print setting storage document (a document DocB') based on the target document. After the processing is completed, it becomes enabled to store the print setting for the source document in the target document.

In step S6007, the command control unit 1002 issues an instruction for applying the print setting acquired in step S6003 to the print setting storage document generated in step S6006 to the print setting document control unit 1004.

By performing the above-described processing, the print setting document control unit 1004 applies the print setting acquired in step S6003 to the print setting storage document generated in step S6006. The print setting stored on the source document corresponding to the drag-and-dropped icon is applied to the target document in the above-described manner. Then, the processing according to the flow chart in FIG. 9 ends.

As described above, in the present exemplary embodiment, an exemplary application unit is implemented by performing the processing in steps S6003 and steps S6005 through S6007.

Furthermore, in the present exemplary embodiment, the source document is an example of one document, while the target document is an example of the other document.

With the above-described configuration, the present exemplary embodiment, as well as being capable of implementing the functions of the above-described first through the fourth exemplary embodiments, can allow the user to apply the print setting for the source document to the target document by merely performing a drag-and-drop operation regardless of whether the drop destination target document is the print setting storage document or the bookbinding setting non-storage document. Note that in the present exemplary embodiment, the modification described in the first and the second exemplary embodiments can be employed.

Now, a sixth exemplary embodiment of the present invention will be described in detail below. In the above-described fifth exemplary embodiment, the source document and the target document are not combined together. In the present exemplary embodiment, the case will be described below where the source document and the target document are combined in the fifth exemplary embodiment.

More specifically, the present exemplary embodiment is different from the above-described fifth exemplary embodiment in the point that the present exemplary embodiment combines the source document and the target document.

Accordingly, in the present exemplary embodiment, the units and components that are the same as those in the first through the fifth exemplary embodiments are provided with the same reference numerals and symbols illustrated in FIGS. 1 through 9. Therefore, the description thereof will not be repeated here.

FIG. 10 is a flow chart illustrating an example of an operation performed in the document management system in the case of applying the print setting for a specific document to another document according to the present exemplary embodiment. In the example in FIG. 10, as in FIGS. 3 and 5 and FIGS. 7 through 9, the processing to be performed after icons for at least two documents are displayed on the display screen of the display apparatus (the CRT 1060) of the document management system client 1000 is illustrated.

Referring to FIG. 10, in step S7001, the user interface unit 1001 determines whether the icon for the print setting storage document (a document DocA) has been dragged (selected) by the user operation. The print setting storage document (the document DocA) is the source document storing therein the print setting (the change source print setting) that the user desires to apply.

If it is determined as a result of the determination in step S7001 that the icon for the source document (the print setting storage document (the document DocA)) has not been dragged (selected) by the user operation (NO in step S7001), then the processing according to the flow chart in FIG. 10 ends.

On the other hand, if it is determined in step S7001 that the icon for the source document (the document DocA) has been dragged (selected) by the user operation (YES in step S7001), then the processing advances to step S7002.

In step S7002, the user interface unit 1001 determines whether the icon for the source document dragged in step S7001 has been dropped onto the icon for the target document (a document DocB) by the user operation.

As described above, in the present exemplary embodiment, an exemplary receiving unit is implemented by performing the processing in steps S7001 and S7002.

Furthermore, in the present exemplary embodiment, the source document is an example of the first document, while the target document is an example of the second document.

If it is determined as a result of the determination in step S7002 that the icon for the source document dragged in step S7001 has not been dropped onto the icon for the target document (the document DocB) by the user operation (NO in step S7002), then the processing according to the flow chart in FIG. 10 ends.

On the other hand, if it is determined in step S7002 that the icon for the source document dragged in step S7001 has been dropped onto the icon for the ptarget document (the document DocB) by the user operation (YES in step S7002), then the processing advances to step S7003.

In step S7003, the command control unit 1002 issues an instruction for displaying a processing selection dialog to the user interface unit 1001. The processing selection dialog is a GUI that allows the user to select between combining the source document and the target document and applying (copying) the print setting for the source document to the target document.

The user interface unit 1001 displays the processing selection dialog according to the instruction from the command control unit 1002.

In step 7004, the command control unit 1002 determines which of combining the source document and the target document and applying the print setting for the source document to the target document has been selected by user.

As described above, in the present exemplary embodiment, an exemplary determination unit is implemented by performing the processing in step S7004.

If it is determined as a result of the determination in step S7004 that the user has selected combining the source document and the target document, then the processing advances to step S7005.

Accordingly, in step S7005, the command control unit 1002 issues an instruction for combining the source document dragged in step S7001 and the target document subjected to dropping in step S7002 to the print setting document control unit 1004.

By performing the above-described processing, the print setting document control unit 1004 combines the source document dragged in step S7001 and the target document subjected to dropping in step S7002 and generates a new bookbinding setting non-storage document (a document DocC). Then, the processing according to the flow chart in FIG. 10 ends.

On the other hand, if it is determined in step S7004 that the user has selected applying the print setting for the source document to the target document, then the processing advances to step S7006.

In step S7006, the command control unit 1002 issues an instruction for acquiring the print setting (for example, the bookbinding setting) in the source document to the print setting document control unit 1004. By performing the above-described processing, the print setting document control unit 1004 acquires the print setting for the source document.

In step S7007, the command control unit 1002 acquires information about the target document subjected to dropping in step S7002 from the print setting document control unit 1004. In addition, the command control unit 1002 determines whether the target document subjected to dropping in step S7002 is the print setting storage document according to the acquired information.

As described above, in the present exemplary embodiment, an exemplary second determination unit is implemented by performing the processing in step S7007.

If it is determined as a result of the determination in step S7007 that the target document subjected to dropping in step S7002 is the print setting storage document (YES in step S7007), then the processing advances to step S7008.

In step S7008, the command control unit 1002 issues an instruction for applying the print setting acquired in step S7006 to the target document to the print setting document control unit 1004.

By performing the above-described processing, the print setting document control unit 1004 applies the print setting for the source document to the target document. In executing the processing in step S7008, the print setting document control unit 1004 applies the print setting for the source document to the target document after discarding all the print settings that have been set for the target document. Then, the processing according to the flow chart in FIG. 10 ends.

On the other hand, if it is determined in step S7007 that the target document subjected to dropping in step S7002 is not the print setting storage document (NO in step S7007), then the processing advances to step S7009.

In step S7009, the command control unit 1002 issues an instruction for generating a print setting storage document that can store therein the print setting from the target document to the print setting document control unit 1004.

By performing the above-described processing, the print setting document control unit 1004 generates a print setting storage document (a document DocB') based on the target document. After the processing is completed, it becomes enabled to store the print setting for the source document in the target document.

In step S7010, the command control unit 1002 issues an instruction for applying the print setting acquired in step S7006 to the print setting storage document generated in step S7009 to the print setting document control unit 1004.

By performing the above-described processing, the print setting document control unit 1004 applies the print setting acquired in step S7006 to the print setting storage document generated in step S7009. Then, the processing according to the flow chart in FIG. 10 ends.

As described above, in the present exemplary embodiment, an exemplary application unit is implemented by performing the processing in step S7006 and steps S7008 through S7010. Furthermore, in the present exemplary embodiment, the source document is an example of one document, while the target document is an example of the other document.

With the above-described configuration, the present exemplary embodiment, as well as being capable of implementing the functions of the above-described first through the fifth exemplary embodiments, can allow the user to select the processing to be executed on the drop destination target document and generate a print setting storage document to which the print setting for the source document has been applied by merely performing the drag-and-drop operation regardless of whether the target document is the print setting storage document or the bookbinding setting non-storage document.

Note that in the present exemplary embodiment, the modification described in the first and the second exemplary embodiments can be employed. In addition, it is also useful if at least two of the above-described first through the sixth exemplary embodiments are implemented in combination with each other.

Each component constituting the document management apparatus and each processing in the document management method according to an exemplary embodiment of the present invention can be implemented by executing a program stored on a RAM or a ROM of a computer. The program and a computer-readable recording medium (storage medium) storing the program is included in the scope of the present invention.

In addition, the present invention can be implemented in a system, an apparatus, a method, a program, or a computer-readable storage medium storing the program, for example. More specifically, the present invention can be applied to a system including a plurality of devices and to an apparatus that includes one device.

Note that the present invention can be implemented by directly or remotely supplying a program of software implementing functions of the above-described exemplary embodiments (in the exemplary embodiments, the program corresponding to the processing performed according to the flow charts in FIGS. 3 and 5 and FIGS. 7 through 10) to a system or an apparatus and reading and executing the supplied program code with the system or a computer of the apparatus.

Accordingly, the program code itself, which is installed on the computer for implementing the functional processing of an exemplary embodiment of the present invention with the computer, implements the present invention. That is, the present invention also includes the computer program implementing the functional processing of an exemplary embodiment of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a computer-readable storage medium such as a CD-ROM and the like which stores the program according to an exemplary embodiment of the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-024309 filed Feb. 4, 2008, which is hereby incorporated by reference herein in its entirety.

What is claimed is:

1. A document management apparatus comprising:
a receiving unit configured to receive a notification indicating that an icon for a first document has been drag-and-dropped onto an icon for a second document via a display screen; and
an application unit configured to apply a print setting stored in the first document to the second document in response to the receiving unit receiving the notification indicating that the icon for the first document has been drag-and-dropped onto the icon for the second document.

2. The document management apparatus according to claim 1, further comprising a detection unit configured to detect whether a print setting is stored in the first document,
wherein the application unit is configured to apply the print setting stored in the first document to the second document in response to the receiving unit receiving the notification indicating that the icon for the first document, which is detected by the detection unit to store the print setting, has been drag-and-dropped onto the icon for the second document.

3. The document management apparatus according to claim 1, further comprising a determination unit configured to determine whether to execute processing for applying the print setting stored in the first document to the second document or to execute other processing according to an operation by a user,
wherein the application unit is configured to apply the print setting stored in the first document to the second document in response to the determination unit determining to execute the processing for applying the print setting stored in the first document to the second document and in response to the receiving unit receiving the notification indicating that the icon for the first document has been drag-and-dropped onto the icon for the second document.

4. The document management apparatus according to claim 1, further comprising a determination unit configured to determine whether a print setting is stored in the second document,
wherein the application unit is configured to change the print setting for the second document to the print setting stored in the first document if the print setting is stored in the second document, and the application unit is configured to apply the print setting stored in the first document to the second document after enabling storing the print setting in the second document if the print setting is not stored in the second document.

5. A document management method comprising:
receiving a notification indicating that an icon for a first document has been drag-and-dropped onto an icon for a second document via a display screen; and
applying a print setting stored in the first document to the second document in response to receiving the notification indicating that the icon for the first document has been drag-and-dropped onto the icon for the second document.

6. The document management method according to claim 5, further comprising:
detecting whether a print setting is stored in the first document; and
applying the print setting stored in the first document to the second document in response to receiving the notification indicating that the icon for the first document, which is detected to store the print setting, has been drag-and-dropped onto the icon for the second document.

7. The document management method according to claim 5, further comprising:
determining whether to execute processing for applying the print setting stored in the first document to the second document or to execute other processing according to an operation by a user; and
applying the print setting stored in the first document to the second document in response to determining to execute the processing for applying the print setting stored in the first document to the second document and in response to receiving the notification indicating that the icon for the first document has been drag-and-dropped onto the icon for the second document.

8. The document management method according to claim 5, further comprising:
determining whether a print setting is stored in the second document; and
changing the print setting for the second document to the print setting stored in the first document if the print setting is stored in the second document, and applying the print setting stored in the first document to the second document after enabling storing the print setting in the second document if the print setting is not stored in the second document.

9. A non-transitory computer-readable storage medium storing instructions which, when executed by a computer, cause the computer to perform operations comprising:
receiving a notification indicating that an icon for a first document has been drag-and-dropped onto an icon for a second document via a display screen; and
applying a print setting stored in the first document to the second document in response to receiving the notification indicating that the icon for the first document has been drag-and-dropped onto the icon for the second document.

* * * * *